United States Patent Office 2,963,369
Patented Dec. 6, 1960

2,963,369

PROTECTING COLOR OF ELECTRON IRRADIATED MEAT

Walter M. Urbain, Western Springs, Ill., assignor to Swift & Company, Chicago, Ill., a corporation of Illinois No Drawing. Filed Nov. 2, 1956, Ser. No. 619,958

3 Claims. (Cl. 99—107)

This invention relates generally to the preservation of meat and more particularly to the treatment of fresh meat with ionizing radiations to inhibit bacterial growth.

In the processing and distribution of meat products, the interval between slaughtering and use of the product by the consumer varies considerably depending on the product. In the case of carcasses, such as beef, lamb, or veal, transcontinental shipment in refrigerator cars is not uncommon. Such shipments require that the product retain good color, flavor, odor, and physical appearance for one to two weeks under refrigeration. Although present practices are adequate in preserving carcasses in good condition for about a week, any additional holding of the product is liable to bring about sufficient bacterial growth to make the product unattractive from the standpoint of color and palatability.

High energy ionizing radiations have been used in the past in the treatment of food materials to produce "cold sterilization." Dosages of penetrating electron beams in the range of 1 to 2 million rep. have been employed to obtain sterilization of fresh meat products. The treatment of fresh meat with sterilizing doses of irradiation, however, results in the development of undesirable flavor and color in the product. An unattractive brown color develops in the carcass as a result of the irradiation treatment and it is this radiation-induced color degradation which has been one of the deterrents to general acceptance of electron irradiation as a technique in meat processing operations. Sub-sterilizing dosages in the range of 100,000 to 200,000 rep. have been employed to extend the shelf life of the meat. Although these reduced dosages result in killing only about 90% of the bacteria present, while dosages in the 1-2 megarep. range achieve substantially complete sterilization, sub-sterilizing dosages retard bacterial development to a degree sufficient for significant extension of shelf life. While irradiated meat is substantially free from bacteria, the brownish color and oxidized flavor produced by the radiation renders the product unacceptable, both in appearance and taste.

It is therefore an object of this invention to provide a method for the electron irradiation of meat whereby radiation-induced discoloration is substantially reduced.

A further object of this invention is to provide a method for sterilizing meat while retaining the natural red color of the meat substantially undiminished.

Additional objects, if not specifically set forth herein, will be readily apparent to one skilled in the art from the following detailed description of the invention.

In accordance with the method of the present invention, fresh meat which is both irradiated and of satisfactory red color is obtained by irradiating the meat with a beam of high energy electrons and by exposing the meat to an oxygen-enriched atmosphere. Although holding the meat in an oxygen enriched atmosphere prior to irradiation is somewhat beneficial in retaining favorable color characteristics, more significant color improvement results when the meat is first irradiated and then held in the oxygenated area.

Previous investigators into the factors involved in radiation-induced discoloration of food products have generally concluded that the presence of oxygen or an oxygenated atmosphere in the area surrounding the product, as well as that dissolved in the product, is to be avoided. Since it has been felt that oxygen is an agent which, in combination with high speed electrons and moisture causes deleterious taste and color changes, it has been proposed that oxygen acceptors, inert gases, or vacuumizing procedures be adopted in processing foods subjected to electron irradiation. The method of the present invention, on the other hand, requires that the product being subjected to irradiation be exposed to an oxygen-enriched atmosphere either prior or subsequent to the irradiation treatment.

In a more specific application of the inventive process disclosed and claimed herein, fresh meat in the form of an animal carcass or parts thereof is subjected to either a pre-irradiation or post-irradiation conditioning treatment in an area containing a high oxygen concentration. While the post-irradiation procedure is preferable, exposure of the meat to a high oxygen medium prior to irradiation results in a noticeable improvement in color. It has previously been recognized that the exposure of fresh unirradiated meat to air results in the conversion of meat pigments to the bright red oxy form. When meat has been discolored by irradiation however, no color improvement is noted when the irradiated sample is exposed to air. It appears, therefore, that the discoloration induced by radiation is distinguishable from the discoloration occurring in unirradiated meats as a result of natural pigments, hemoglobin and myoglobin. The amount of oxygen in the oxygen enriched atmosphere and the time during which the irradiated product is held in the atmosphere are interrelated inasmuch as color recovery is much more rapid when the treating area is maintained under a positive pressure of oxygen. The following illustrative examples show the improvement in color recovery obtained through the use of oxygen in conjunction with irradiation.

The color grades set forth in the examples which follow are based on the following scale:

1-2 very poor
3-4 poor
5-6 fair
7-8 good
9-10 excellent

Example I

Beef steaks from one animal were irradiated at 200,000 rep. One sample was contacted with oxygen prior to irradiation and another contacted with oxygen after irradiation. An unirradiated control, held in air, was used for color comparison.

Sample: Color grade
1. Control _____ 7
2. Irradiated (held in oxygen after irradiation)__ 9
3. Irradiated (held in oxygen prior to irradiation)_ 8
   Oxygen pressure—900 p.s.i. for 4 hours.

The irradiation dosage in the above example is for sub-sterilizing doses, since complete sterilization requires dosages in the range of 1,000,000–2,000,000 rep. Sub-sterilization, sufficient to extend the storage life of the product substantially, is obtained with these lower doses however.

Example II

To demonstrate the effect of oxygen pressure on color restoration, beef steaks were treated in the same manner as in Example I, with the exception that a lower gas pressure for a longer period of time was employed.

Sample: Color grade
1. Control ------------------------------------- 8
2. Irradiated (held in air) -------------------- 3
3. Irradiated (held in oxygen after irradiation) -- 6
4. Irradiated (held in oxygen prior to irradiation) ------------------------------------- 5

Oxygen pressure—200 p.s.i. for 16 hours.

The poor color exhibited by the beef steak which was irradiated and held in non-oxygenated air demonstrates the requirement that the contacting atmosphere be oxygen-enriched.

*Example III*

In order to show the applicability of the subject invention to meat products which have been subjected to drastic sterilizing doses of electrons, several samples were vacuum-sealed in flexible wrappers and irradiated at 2,000,000 rep.

Sample: Color grade
1. Control (unirradiated, vacuumized) -------- 6
2. Control (after exposure to air) ------------ 9
3. Irradiated in vacuum (held in vacuum) ----- 5
4. Irradiated in vacuum (exposed to air after irradiation) ------------------------------- 5
5. Irradiated in vacuum (exposed to oxygen at 200 p.s.i. for 16 hours) ------------------ 7

*Example IV*

Lamb flanks from one animal were irradiated at the 100,000 rep. level and contacted with oxygen at a pressure of 900 p.s.i. for varying periods of time.

Sample: Color grade
1. Control (unirradiated, held in air) --------- 8
2. Control (unirradiated, held in oxygen) ------ 9
3. Irradiated (held in air for 16 hours) -------- 5
4. Irradiated (held in oxygen for 1 hour) ------ 6
5. Irradiated (held in oxygen for 4 hours) ----- 8
6. Irradiated (held in oxygen for 16 hours) ---- 8

The interdependence of oxygen pressure and exposure time is shown by the above data.

*Example V*

Lamb carcasses were irradiated at the 100,000 rep. level and placed in a room where the oxygen concentration was maintained at about 80 percent of the total gas pressure. The samples held in the oxygen enriched atmosphere were scored 8, while similar irradiated carcasses which were held in air subsequent to irradiation were scored 6.

In accordance with the above tests, several carcasses were irradiated at the 100,000 to 200,000 rep. level to extend the storage life thereof and the irradiated carcasses were placed in a refrigerated car containing a continuous source of oxygen. The percentage of oxygen in the car was maintained at approximately 80 percent of the total atmosphere of the air. Inasmuch as the refrigerator car was not gas tight, the oxygen was not under pressure in the car. After 14 days' storage, the carcasses were substantially free of bacteria, of good physical appearance, and exhibited the natural bright red meat color typical of the carcasses prior to irradiation. It has been found that a somewhat greater than 5 percent excess over the amount of oxygen normally present in the atmospheric air is effective in achieving color restoration, although atmospheres containing 50 percent oxygen and preferably 80 percent oxygen have been found to be most effective.

In another modification of the invention the effect of varying oxygen tension by varying the pressure of the surrounding atmosphere was noted. It was found that increasing oxygen tension by increasing the pressure of the air surrounding the irradiated meat was comparable in effect to increasing the ratio of oxygen to nitrogen at atmospheric pressure. Holding the meat in an air atmosphere at a pressure between about 15 and 60 p.s.i. either before or after irradiation thereof resulted in a significant improvement in color.

By "oxygen enriched" as used herein is meant an atmosphere containing in excess of about 30 percent oxygen. It also includes ordinary air under pressure since oxygen tension per unit volume is increased by the increased pressure.

Although electron beams have been used for irradiation in the preferred form of the invention, other sources of radiation may be employed. Examples of other sources of radiation are beta rays, X-rays, and various types of linear accelerators as well as fission by-products or other sources of radioactivity producing gamma rays.

Obviously, many modifications and variations of the invention as hereinbefore set forth may be made without departing from the spirit and scope thereof, and therefore only such limitations should be imposed as are indicated in the appended claims.

I claim:
1. A method for extending the shelf life of fresh meat and inhibiting radiation-induced color degradation comprising the steps of treating said meat with high speed electrons at a dosage sufficient to inactivate the major portion of bacteria present on the surface of said meat, said dosage being in the range of 0.1–0.2 megarep.; introducing the irradiated meat to an oxygen-enriched atmosphere; and holding said meat in said oxygen-enriched atmosphere for a time sufficient to substantially restore the bright red color to said meat.

2. A method of inhibiting color degradation in the electron irradiation of fresh meat which comprises: treating said meat with sterilizing high-speed electrons at a dosage sufficient to substantially inactivate undesirable micro-organisms; introducing the irradiated meat to an oxygen-enriched atmosphere; and maintaining said meat in said oxygen-enriched atmosphere for from about 1 hour to about 14 days to substantially restore the bright red color to said meat.

3. A method for sterilizing fresh meat and inhibiting discoloration thereof which comprises: subjecting said meat to a sterilizing dose of high-speed electrons at a level of from about 1 megarep. to about 2 megarep. to substantially destroy bacteria therein, contacting said substantially bacteria-free meat with an oxygen containing atmosphere in which said oxygen comprises at least about 30 percent thereof and holding said substantially bacteria-free meat in contact with said oxygen containing atmosphere for from about 1 hour to about 14 days to substantially restore the preirradiation color of said meat.

References Cited in the file of this patent

UNITED STATES PATENTS 2,456,909   Brasch ---------------- Dec. 21, 1948
2,711,373   Coleman et al. --------- June 21, 1955

OTHER REFERENCES

Food Technology, March 1953, pp. 109–115, inclusive, artical entitled, Effect of Processing Conditions on Organoliptic Changes in Foodstuffs Sterilized With High Intensity Electrons by W. Huber et al.

Refrigerating Engineering, June 1956, Technical Section 1, pp. 39 to 49, inclusive, and 98, article entitled Combining Gamma Radiation, Refrigeration by L. E. Brownell et al.